United States Patent
Yamamoto et al.

(10) Patent No.: US 6,385,182 B1
(45) Date of Patent: May 7, 2002

(54) MOBILE-STATION TRANSMITTER/RECEIVER

(75) Inventors: Katsuya Yamamoto, Tokyo; Nobuaki Inoue, Kanagawa, both of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/232,629

(22) Filed: Jan. 19, 1999

(30) Foreign Application Priority Data

Jan. 23, 1998 (JP) .......................................... 10-011608

(51) Int. Cl.⁷ .............................................. H04B 7/216
(52) U.S. Cl. ...................................... 370/335; 370/515
(58) Field of Search ................................. 370/328, 335, 370/342, 311, 350, 431, 329, 441, 501, 509, 515; 375/130, 359, 367, 369, 370; 455/502, 504, 506

(56) References Cited

U.S. PATENT DOCUMENTS

| | | | |
|---|---|---|---|
| 5,661,765 A | * 8/1997 | Ishizu | 375/376 |
| 5,881,055 A | * 3/1999 | Kondo | 370/311 |
| 5,901,160 A | * 5/1999 | Abe et al. | 370/465 |
| 6,009,131 A | * 12/1999 | Hiramatsu | 375/354 |
| 6,052,602 A | * 4/2000 | Yamamoto | 455/525 |
| 6,111,872 A | * 8/2000 | Suematsu et al. | 370/350 |

* cited by examiner

Primary Examiner—Ajit Patel
(74) Attorney, Agent, or Firm—Jay H. Maioli

(57) ABSTRACT

When a request is generated for shift from continuous to intermittent reception, the mobile-station transmitter/receiver calculates a start timing of a slot allocated thereto (Tstart), compares it with a concurrent time when the request has been generated (Tnow), and when it is not possible to have a time of preparation required for starting a reception in the slot by the start timing of a nearest slot (Tstart), the mobile-station maintains the continuous reception until the slot ends (Tend).

2 Claims, 5 Drawing Sheets

MOBILE-STATION TRANSMITTER/RECEIVER

BACKGROUND OF THE INVENTION

1. Field of the Invention

The present invention relates to a mobile-station transmitter/receiver, and more particularly, to a mobile-station transmitter/receiver suitable for organization of a mobile communications network system using the code division multiplex access, for example.

2. Description of Related Art

In the conventional mobile communications network systems, the mobile-station transmitter/receiver makes an intermittent reception while waiting for an incoming communication to avoid battery consumption for the standby period. The conventional mobile communications network systems currently use various types of mobile-station transmitter/receivers using frequency division multiplex access (FDMA), time division multiplex access (TDMA), code division multiplex access (CDMA), etc. for intermittent reception in practice. These intermittent reception methods have some advantages and are disadvantageous in some points. For a mobile communications network system, any of the above methods is selected which has suitable characteristics for a purpose of the mobile communications network system. Also, the mobile-station transmitter/receiver adopting an intermittent reception method is defined in detail for each mobile communications network system.

A mobile-sation transmitter/receiver based on the code division multiplex access (CMDA), for example, uses a special code (pseudorandom noise sequence=PN) allocated to each communications circuit to spread a modulated wave derived from a carrier frequency to a wider band than that of the original carrier frequency (will be referred to as "spectrum spreading" hereinunder) and modulates each modulated wave thus spectrum-spread for transmission. By synchronizing a received spectrum-spread signal with a PN code supplied via a circuit for which demodulation is intended, the mobile-station transmitter/receiver discriminates only the intended circuit from others.

More particularly, the transmitting side will allocate different PN codes to individual communications circuits. The PN code comprises a pseudorandom noise sequence as mentioned above. The transmitting side multiplies each modulated wave for transmission via each circuit by a PN code, different from one circuit to another, to spectrum-spread the wave. The modulated wave has been subjected to a predetermined modulation before the spectrum spreading. Each modulated wave thus spectrum-spread is multiplexed for transmission.

At the receiving side, an incoming signal from the transmitting side is multiplied by a same PN code as a one allocated to a circuit for which demodulation is intended, with the PN codes being synchronized with each other. Thus, only the modulated wave having been transmitted via the intended circuit can be demodulated.

As aforementioned, CDMA allows a direct communication to be made between the transmitting and receiving sides at each call only by setting a same PN code at both the sides. With CDMA, since a modulated wave is spectrum-spread using different PN code for each circuit, the receiving side can only demodulate a spectrum-spread signal transmitted via a circuit for which demodulation is intended. Also the PN code is a pseudorandom noise sequence as described in the above. Therefore, the CDMA method can be said to be superior in keeping confidentiality of information transferred between the transmitting and receiving sides.

In a mobile communications network system using CDMA, the base-station transmitter/receiver at the receiving side repeatedly sends a PN code (will be referred to as "pilot signal" hereinunder) to acquire and maintain a synchronization at a mobile-station transmitter/receiver and to regenerate a clock. Detecting pilot signals sent from a plurality of base-station transmitters/receivers, the mobile-station transmitter/receiver at the receiving side allocates detected timings to demodulators, respectively. In the mobile-station transmitter/receiver, the demodulator generates PN code. By multiplying, by a generated PN code, a spectrum-spread signal transmitted from an intended base-station transmitter/receiver at an allocated timing, the mobile-station transmitter/receiver demodulates the signal.

For shift from continuous to intermittent mode of reception, the mobile-station transmitter/receiver calculates a start timing of a next slot and goes into non-reception interval. Before the start timing of a desired slot, the mobile-station transmitter/receiver detects a pilot signal sent from the base-station transmitter/receiver, allocates te pilot signal to a demodulator for demodulation of the signal, and gets into a slot again. After receiving a pilot signal in the desired slot, the mobile-station transmitter/receiver calculates a start timing of a next slot and goes into non-reception interval. Thereafter, the mobile-station transmitter/receiver will repeat the above-mentioned procedure to implement an intermittent reception.

Generally, even while the mobile-station transmitter/receiver is waiting for an incoming communication, it is sending a control information to the base-station transmitter/receiver in order to register its location required for standing in the mobile communications network system. When sending the control information to the base-station transmitter/receiver, the mobile-station transmitter/receiver shifts from the intermittent to continuous reception to receive a response from the base-station transmitter/receiver. Namely, while the mobile-station transmitter/receiver is waiting for an incoming communication, it is receiving with frequent shift between the continuous and intermittent modes of reception.

The mobile-station transmitter/receiver shifts from a continuous to intermittent mode of reception following the steps (1) to (7) as shown in FIG. 1.

(1) A request for shift from a continuous to intermittent reception is generated.

(2) Start timing of a slot allocated to a mobile-station transmitter/receiver in the closest proximity is calculated to assure a time of preparation for re-synchronization, namely, to be in time to the slot.

(3) The mobile-station transmitter/receiver is set to get started at the start time of a preparation for the intermittent reception, and stops the reception.

(4) The mobile-station transmitter/receiver gets started at the start time of the preparation for the intermittent reception, and detects a pilot signal.

(5) The mobile-station transmitter/receiver uses the detected pilot signal to start a demodulation.

(6) Upon completion of the slot, the mobile-station transmitter/receiver calculates a start timing of a next slot.

(7) The mobile-station transmitter/receiver is set to get started at the start time of a preparation for intermittent reception, and stops the reception. Thereafter, it repeats the above steps.

Nevertheless, when shifting from a continuous to intermittent reception as mentioned in the above, the mobile-station transmitter/receiver will have to have synchronization with the base-station transmitter/receiver prior to a start timing of slot. In particular, it is necessary in CDMA for the mobile-station transmitter/receiver to search and re-acquire, prior to the start timing of slot, a pilot signal it has once lost because it has been in the non-reception status in order to shift to the intermittent mode of reception and to allocate the re-acquired pilot signal to a demodulator. To this end, the mobile-station transmitter/receiver needs a time to recover from the non-reception status before the start timing of its intended slot and make a preparation for the start of reception.

Start and stop of intermittent reception are determined by a call control protocol. A request for shift between continuous and intermittent modes of reception is generated irregularly. When the mobile-station transmitter/receiver decides to shift from a continuous to intermittent reception, it has to select a start timing of a slot which assures a period of preparation for starting the slot. As shown in FIG. 2, if a period between the start timing of a slot allocated to the mobile-station transmitter/receiver and a requested timing for shift from continuous to intermittent reception is shorter than a predetermined length of time, the mobile-station transmitter/receiver cannot get ready for reception in a next slot.

Thus, if the time of preparation for starting a reception in a nearest slot allocated to the mobile-station transmitter/receiver is insufficient when a request for shift from a continuous to intermittent reception is generated, the mobile-station transmitter/receiver will fail to receive in the allocated slot at the time of shift from continuous to intermittent reception. In this event, the mobile-station transmitter/receiver will not be able to make a reception in the nearest allocated slot and will do it by selecting a start timing of a next slot following the closest allocated slot.

If the period of the slot for an intermittent reception is short, failure to receive in the allocated slot will relatively less influence the performance of the mobile-station transmitter/receiver. If the period of the slot for an intermittent reception is long, however, the failure to receive in the allocated slot will cause such an influence that the mobile-station transmitter/receiver seems as if it had the performance deteriorated. For example, if the mobile-station transmitter/receiver fails to receive in an allocated slot when a request for reception is made, it will have to be in the non-reception status until reception in a next slot, so that the mobile-station transmitter/receiver will not respond to the calling side having requested for the reception for a long time.

SUMMARY OF THE INVENTION

It is therefore an object of the present invention to provide a mobile-station transmitter/receiver adapted not to fail in receiving in an allocated slot at the time of frequent shift from continuous to intermittent reception.

According to the present invention, there is provided a mobile-station transmitter/receiver, in which a start timing of a next slot allocated to the mobile-station transmitter/receiver is calculated at the time of a shift from a continuous to intermittent mode of reception; it is compared with a required timing for shift to an intermittent reception; and when the mobile-station transmitter/receiver could not get ready for starting the reception in a nearest slot can be done by the start of the slot, the continuous reception is maintained until completion of the slot to prevent a failure in reception in a slot.

These objects and other objects, features and advantages of the present intention will become more apparent from the following detailed description of the preferred embodiment of the present invention when taken in conjunction with the accompanying drawings.

DETAILED DESCRIPTION OF THE PREFERRED EMBODIMENTS

The mobile-station transmitter/receiver according to the present invention is adapted for use in the code division multiple access (CDMA) communications network system standardized as "IS-95 system" in the United States of America.

Figure 3:
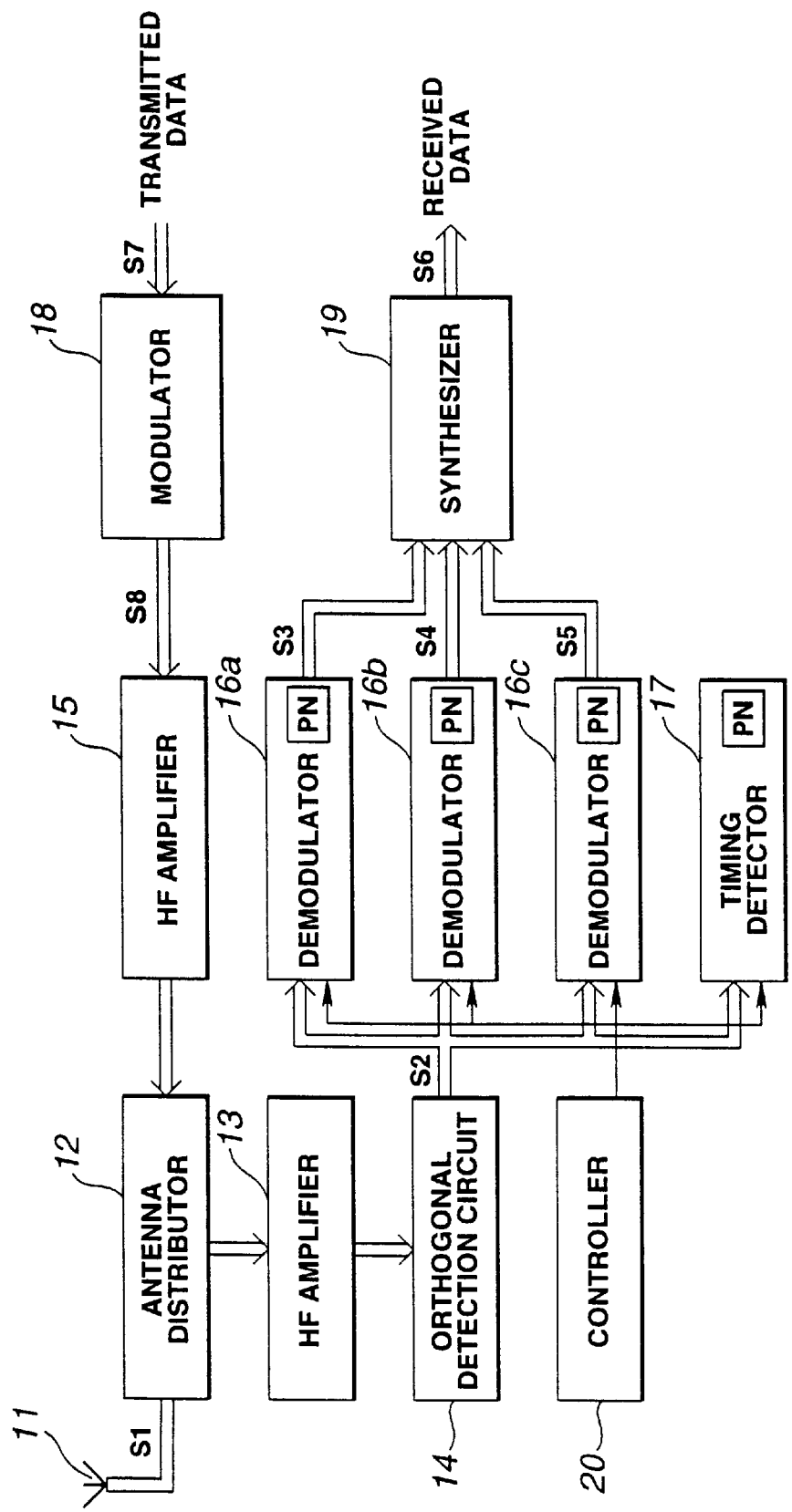
FIG. 3 is a block diagram of the mobile-station transmitter/receiver according to the present invention.

Referring now to FIG. 3, there is illustrated a mobile-station transmitter/receiver according to the present invention, in which a received signal S1 received by an antenna 11 is sequentially supplied to an antenna distributor 12, HF (high frequency) amplifier 13 and orthogonal detector circuit 14 and thus converted to a base band signal S2. The base band signal S2 provided from the orthogonal detector circuit 14 is analog-digital converted by an A/D converter (not shown) and supplied to a plurality of demodulators 16a, 16b and 16c and a timing detector 17.

The timing detector 17 detects from the base band signal S2 a pilot signal sent from the base-station transmitter/receiver. To detect the pilot signal, the timing detector 17 has an internal PN generator to generate a PN (pseudorandom noise sequence) code allocated to each communications circuit. Also the timing detector 17 allocates a timing based on the pilot signal thus detected to each of the demodulators 16a, 16b and 16c via a controller 20. The demodulators 16a, 16b and 16c demodulate the base band signal S2 at their respective allocated timing, and deliver demodulated signals S3, S4 and S5 to a synthesizer 19.

More particularly, in the demodulators 16a, 16b and 16c, their internal PN generators generate PN codes. The base band signal S2 is multiplied by the PN code to demodulate the base band signal S2. Each base-station transmitter/receiver transmits a timing of the PN signal at a timing peculiar to the base-station transmitter/receiver. Therefore, the PN code is synchronized with the timing indicated by the pilot signal, and the synchronized PN signal is used to demodulate the base band signal S2, whereby only a signal transmitted from an intended base-station transmitter/receiver can be selectively demodulated. It should be noted that the synchronization between the timing indicated with the pilot signal and timing of the PN code generated in the demodulator is called "lock".

Each of the demodulators 16a, 16b and 16c demodulates the supplied base band signal S2 using the PN signal.

Namely, the mobile-station transmitter/receiver receives a signal transmitted from the base-station transmitter/receiver over transmission paths having a predetermined length as well as over transmission paths of different lengths through reflection by obstacles such as building or similar. A plurality of reflected waves received via such as plurality of propagation paths is generically called "multipath". Since generally there exist multipaths in practice, the mobile-station transmitter/receiver incorporates the plurality of demodulators 16a, 16b and 16c which are operated correspondingly to a number of paths or a number of base-station transmitters/receivers from which the mobile-station transmitter/receiver can receive signal. In the mobile-station transmitter/receiver shown in FIG. 3, signals S1 different only in timing received via three transmission paths are demodulated by the demodulators 16a, 16b and 16c, respectively.

The synthesizer 19 is supplied with the demodulated signals S3, S4 and S5 from the multipath to process the demodulated signals S3, S4 and S5. Since these signals S3, S4 and S5 are demodulated at different timings, the synthesizer 19 processes the signals through synchronization of their timings to synthesize a received data S6 whose signal-to-noise and antijam ratios. The received data S6 thus obtained is delivered to a circuitry including an audio circuit, etc.

The mobile-station transmitter/receiver also incorporates a transmission circuitry in which a transmitted data S7 is supplied to a modulator 18 where it is subjected to a spectrum spread and OQPSK (offset quadrature phase shift keying) to provide a modulated signal S8. Further in the mobile-station transmission/receiver, the modulated signal 88 from the modulator 18 is amplified by an HF amplifier 15 and transmitted by radiation via the antenna distributor 12 and antenna 11 in this order.

Figure 4:
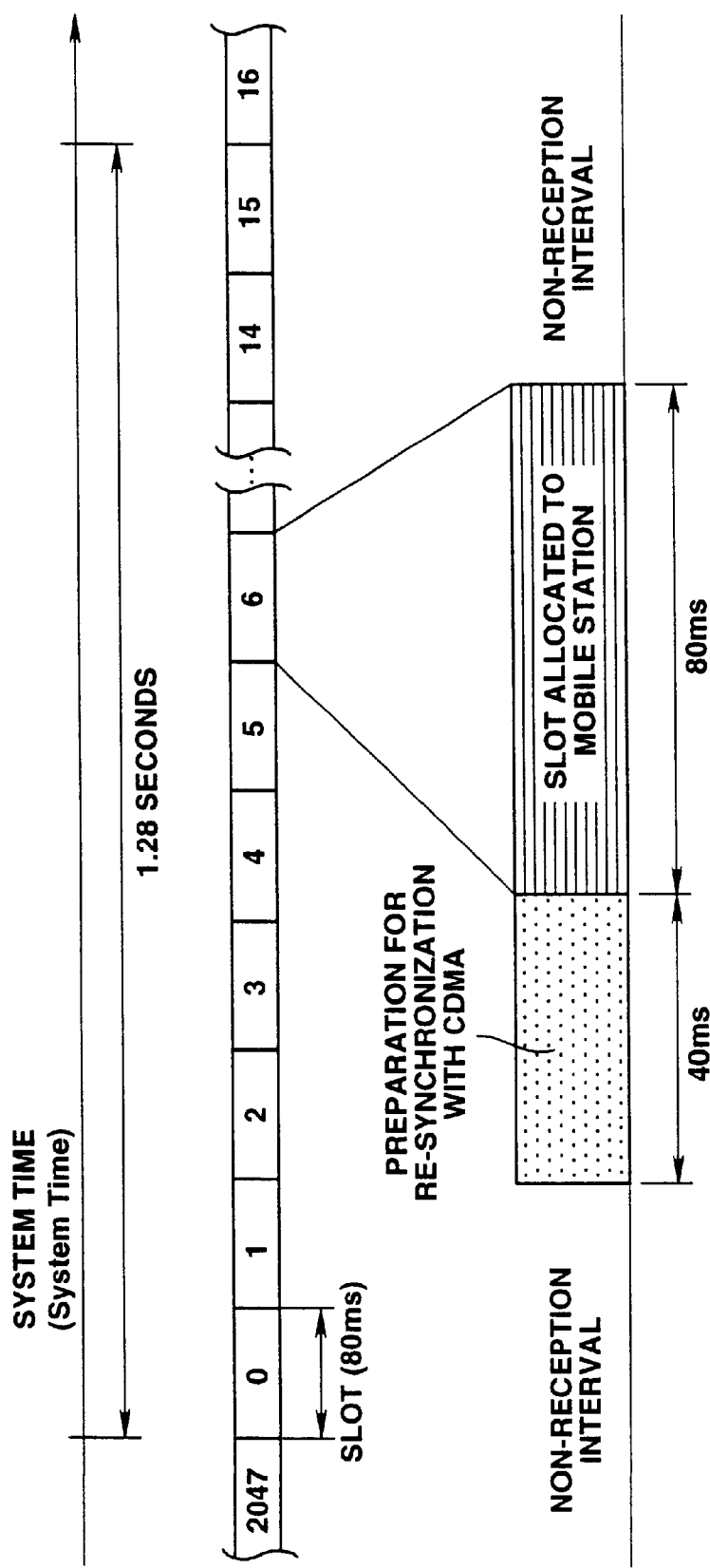
FIG. 4 is a time chart of intermittent-reception operations based on CDMA.

In the CDMA communications network system standardized as "IS-95 system", the mobile-station transmitter/receiver operates as will be shown in FIG. 4. First, when the power supply is turned on, an initial synchronization with the base-station transmitter/receiver is established to acquire a system time. The system time is a time information used in the CDMA system. It is maintained and continuously updated at both the mobile- and base-station transmitters/receivers. Start and end timings of a slot during the intermittent reception mode of the mobile-station transmitter/receiver are based on this system time. More particularly, in the CDMA system, each mobile-station transmitter/receiver is allocated a paging channel slot of 80 ms for which the mobile-station transmitter/receiver can receive data from the base-station transmitter/receiver. The period T of intermittent reception is 1.28 sec as defined by the following formula:

T (seconds)=1.28*2i (i=0, 1, . . . , 7)

Therefore, the shortest period of intermittent reception is 1.28 sec (16 slots) and the longest period is 153.84 sec (2,048 slots). FIG. 4 shows the shortest period of intermittent reception of 1.28 sec. For example, "Slot No. 6" is allocated as reception period. In this case, a next slot is "Slot No. 22" (=6+16).

In the mobile-station transmitter/receiver, for judgment of an intermittent-reception period and determination of a "No." for an allocated slot, it is necessary to receive, for analysis, a control message sent from the base-station transmitter/receiver. More particularly, a period of intermittent period and allocated slot No. are determined by a call control software (layar3). To start a reception after a non-reception interval in an intermittent reception status, it is required to acquire re-synchronization with the CDMA communications network system.

The "acquisition of re-synchronization" referred to herein includes setting of a radio channel (frequency), detection of pilot signal which is sent from the base-station transmitter/receiver, and starting of demodulation by the demodulator using the pilot signal. The time required for the re-synchronization depends upon the performance of the mobile-station transmitter/receiver. It will be assumed to be 40 ms in the following description of the embodiment of the present invention.

When shifting from a continuous to intermittent mode of reception, the mobile-station transmitter/receiver calculates a start timing of a nearest allocated slot allocated. If the time from the request for shift to the intermittent reception until starting of the slot is not enough to get ready for starting the reception in the slot, the continuous reception is maintained up to completion of the reception in the slot allocated to the mobile-station transmitter/receiver, thereby avoiding failure in reception in the allocated slot. The above-mentioned system time is used as time information for this procedure.

Figure 5:
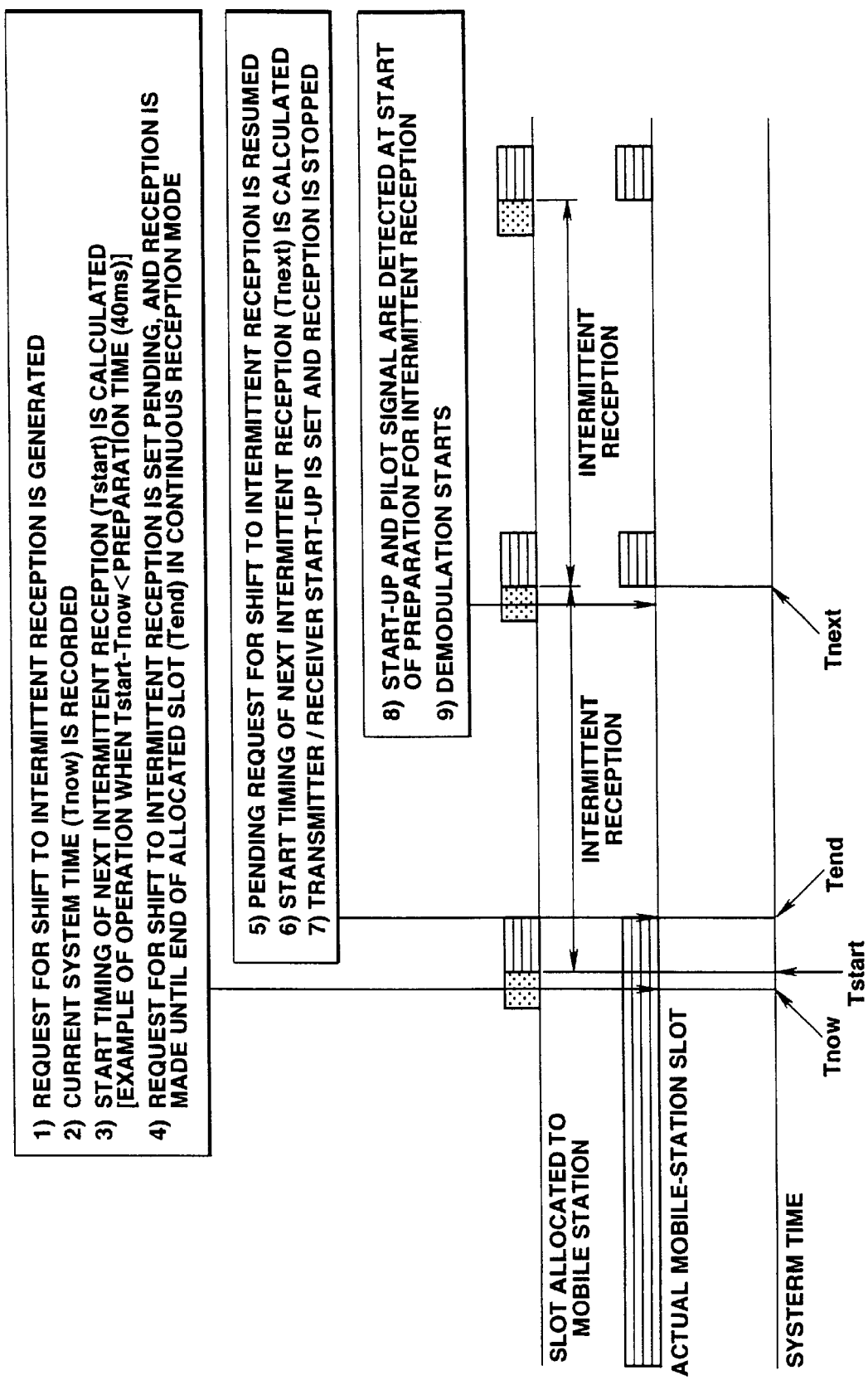
FIG. 5 is a time chart of intermittent-reception operations done in the mobile-station transmitter/receiver.

More particularly, if the mobile-station transmitter/receiver could not get ready for starting the reception in the allocated slot by the start timing of a nearest allocated slot when it has been requested to shift to intermittent reception, it will shift to the intermittent reception by following the steps (1) to (9) as shown in FIG. 5. As previously mentioned, the system time is a time information maintained and updated at both the base- and mobile-station transmitters/receivers. The mobile-station transmitter/receiver can always make a reference to the system time. In the CDMA communications network system of the IS-95, the system time is 20 ms.

(1) Request for shift to intermittent reception is generated from the call control protocol.

(2) The concurrent system time (Tnow) at the occurrence of the request for shift to intermittent reception is recorded.

(3) A start timing of a next intermittent reception (slot top system time Tstart) allocated to the mobile-station transmitter/receiver is calculated based on the following:

[Tstart−Tnow<Preparation time]

(4) The request from the call control protocol for shift to intermittent reception is set pending, and the mobile-station transmitter/receiver continues the continuous reception until an end time of the allocated slot (Tend)

(5) At the end time of allocated slot Tend, the mobile-station transmitter/receiver starts a procedure in response to the pending request for shift to intermittent reception.

(6) The mobile-station transmitter/receiver calculates a start timing (Tnext) of a next allocated slot.

(7) The mobile-station transmitter/receiver is set to get started at the start time of a preparation for reception corresponding to the start timing of the next slot (Tnext), and stops the reception.

(8) The mobile-station transmitter/receiver gets started at te start time of preparation for reception and detects the pilot signal from the base-station transmitter/receiver.

(9) The mobile-station transmitter/receiver starts to demodulate the pilot signal, and thereafter repeats these steps.

Figure 1:
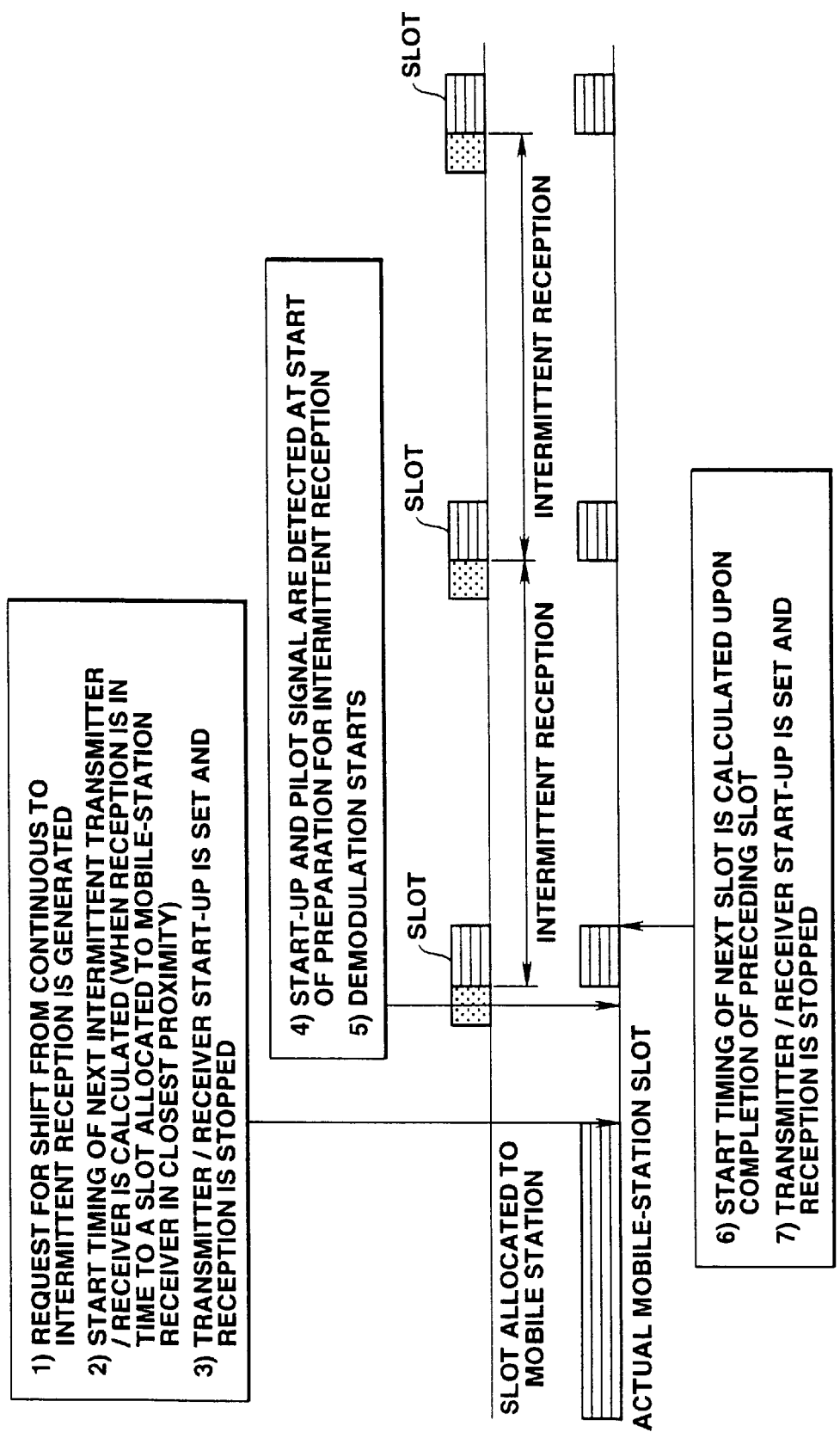
FIG. 1 is a time chart of intermittent-reception operations done by the conventional mobile-station transmitter/receiver when it can get ready for reception in time to a slot allocated to the mobile-station transmitter/receiver.
Figure 2:
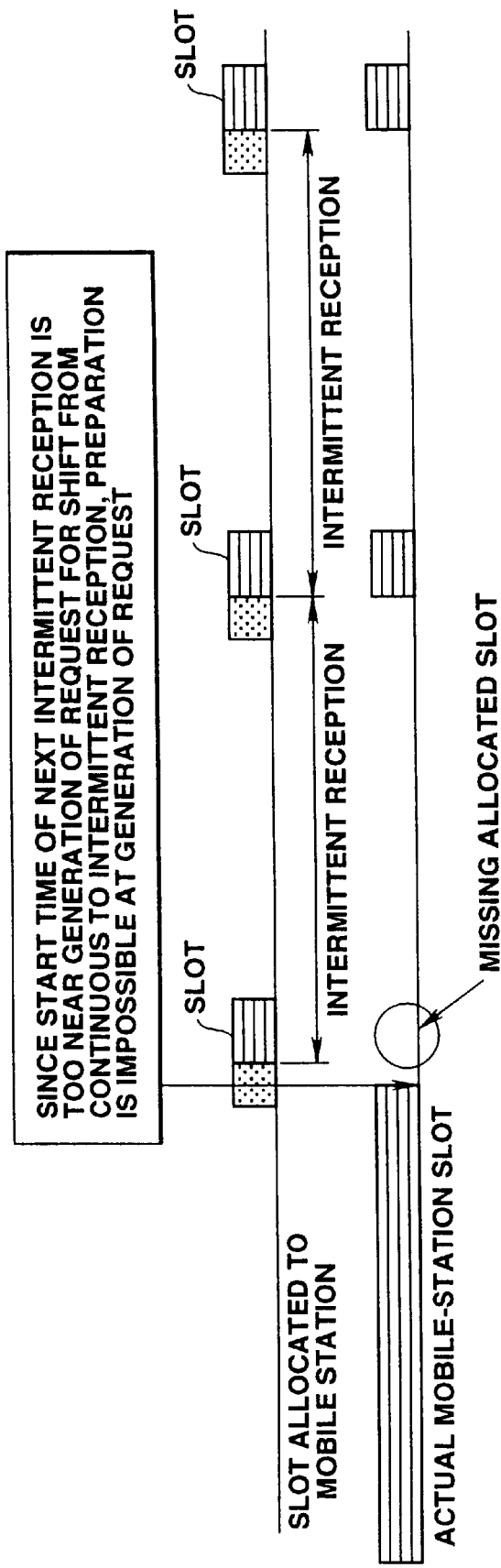
FIG. 2 is a time chart of intermittent-reception operations done by the conventional mobile-station transmitter/receiver when it cannot not get ready for reception in time to a slot for the mobile-station transmitter/receiver.

If the mobile-station transmitter/receiver could get ready for starting the reception in the allocated slot by the start timing of the nearest allocated slot when it has been requested to shift to intermittent reception, it will shift to the intermittent reception by following the steps (1) to (7) as shown in FIG. 1.

(1) A request for shift from a continuous to intermittent reception is generated.

(2) Start timing of a slot allocated to a mobile-station transmitter/receiver in the closest proximity is calculated to assure a time of preparation for re-synchronization, namely, to be in time to the slot.

(3) The mobile-station transmitter/receiver is set to get started at the start time of a preparation for the intermittent reception, and stops the reception.

(4) The mobile-station transmitter/receiver gets started at the start time of the preparation for the intermittent reception, and detects a pilot signal.

(5) The mobile-station transmitter/receiver uses the detected pilot signal to start a demodulation.

(6) Upon completion of the slot, the mobile-station transmitter/receiver calculates a start timing of a next slot.

(7) The mobile-station transmitter/receiver is set to get started at the start time of a preparation for intermittent reception, and stops the reception. Thereafter, it repeats the above steps.

As having been described in the foregoing, in the mobile-station transmitter/receiver according to the present invention, a length of time from generation of a request for shift to continuous to intermittent reception until a start time of a next slot is compared with a time required for re-synchronization with the CDMA communications network system to judge how to shift to the intermittent mode of reception. In the actual CDMA system, however, it is difficult to successfully acquire again, within a predetermined length of time without fail, a synchronization with the CDMA system once lost due to a stop of reception. Namely, if the mobile-station transmitter/receiver makes continuous reception, it can follow up with the sync timing which incessantly varies with the external radio environment. For re-acquisition of a synchronization, once lost, with the base-station transmitter/receiver, the mobile-station transmitter/receiver has to repeat almost the initial procedure for acquisition of a synchronization with the base station.

Therefore, as a criterion for judgment of whether the continuous reception is maintained, a margin may be added to a preparation time required for re-synchronization with the CDMA system. In this case, however, the mean ratio of intermittent reception will be lower and the battery be excessively consumed but the mobile-station transmitter/receiver can receive in an allocated slot more positively.

What is claimed is:

1. A mobile-station transmitter/receiver used in a mobile communications network system comprising at least a base-station transmitter/receiver and a plurality of mobile-station transmitters/receivers, comprising:

means of controlling shift between a continuous reception and an intermittent reception;

the controlling means calculating a start timing of a next slot for intermittent reception, allocated to the mobile-station transmitter/receiver at the time of a shift from a continuous to intermittent mode of reception, and when a time from the timing of shift to intermittent reception until the start timing of the allocated slot is less than predetermined, maintaining the continuous reception until end of the allocated slot, and then switching the mobile-station transmitter/receiver into the intermittent mode of reception.

2. The mobile-station transmitter/receiver as set forth in claim 1, wherein it adopts a code division multiplex access (CMDA) method and generates PN codes synchronous with a pilot signal sent from the base-station transmitter/receiver prior to the start timing of the slot in the intermittent mode of reception.

* * * * *